United States Patent

[11] 3,578,090

| [72] | Inventor | Ted L. Cline<br>P.O. Box 38, Rush Springs, Okla. 43082 |
|---|---|---|
| [21] | Appl. No. | 796,477 |
| [22] | Filed | Feb. 4, 1969 |
| [45] | Patented | May 11, 1971 |

[54] SUBSOILER CHISEL PLOW
5 Claims, 6 Drawing Figs.

[52] U.S. Cl. ............................................. 172/439, 172/699
[51] Int. Cl. ............................................. A01b 13/08, A01b 59/043
[50] Field of Search .......................... 172/439, 448, 739, 699, 700, 652, 689, 484; 3/21

[56] References Cited
UNITED STATES PATENTS

| 35,686 | 6/1862 | Jewett | 3/21X |
| 2,649,721 | 8/1953 | Spedding | 172/448 |
| 2,960,172 | 11/1960 | Henson | 172/448 |
| 3,014,539 | 12/1961 | Ward | 172/448X |
| 3,450,212 | 6/1969 | Sylvester | 172/699 |

FOREIGN PATENTS

| 1,406,175 | 6/1965 | France | 172/699 |
| 1,080,810 | 2/1959 | Germany | 172/439 |
| 661,914 | 11/1951 | Great Britain | 172/699 |
| 279,462 | 11/1964 | Netherlands | 172/700 |

Primary Examiner—Robert E. Pulfrey
Assistant Examiner—J. Reed Fisher
Attorney—Dunlap, Laney, Hessin and Dougherty

ABSTRACT: A subsoiler chisel plow including a horizontal, perforated or apertured frame having a plurality of downwardly and forwardly extending chisel teeth secured to the frame. The frame has pairs of horizontally spaced hitch brackets on the forward side thereof and has a special angle of attack adjustment structure projecting upwardly therefrom and adapted for connection to the central hitch of a towing vehicle having a three-point hitch connection.

PATENTED MAY 11 1971         3,578,090

INVENTOR.
TED L. CLINE
BY
Dunlap, Janney, Hessin & Dougherty
ATTORNEYS 3,578,090

SUBSOILER CHISEL PLOW

BACKGROUND OF THE INVENTION

1. Field of the Invention

This invention relates to plows, and more particularly, to sub-soiler chisel plows.

2. Brief Description of the Prior Art

With the evolution of farm tractors having more powerful engines, it has become possible to design chisel plows which will penetrate deeply in the soil and which can be easily drawn by these tractors to accomplish a sub-soiling function. Even so, on some occasions and in some types of terrain, it would be desirable to have much larger and heavier chisel plows which will penetrate to depths of 30 inches to 48 inches. When chisel plows are manufactured to have sufficient size and strength to accomplish this function, however, their sheer bulk and weight make mounting on, and handling by, the largest farm tractors somewhat difficult.

BRIEF DESCRIPTION OF THE PRESENT INVENTION

The present invention is a heavy duty chisel plow capable of penetrating the soil to a relatively great depth. Broadly described, the chisel plow of the invention comprises a frame having a plurality of downwardly extending, forwardly curved chisel blades or teeth attached by shear pins to the frame. The frame is provided with a plurality of large apertures to reduce its weight, and has pairs of horizontally spaced hitch brackets projecting from the forward side of the frame. Secured to the central portion of the frame and projecting upwardly therefrom is an angle of attack adjustment structure which includes means for securing the plow to the central hitch link of a farm tractor three-point hitch connection.

An important object of the invention is to provide a heavy duty chisel plow which can be attached to, and operated from, an agricultural tractor.

Another object of the invention is to provide a chisel plow capable of chiseling the earth to a depth in excess of 30 inches.

A further object of the invention is to provide a heavy duty chisel plow which can be quickly and easily adjusted in its angle of attack with respect to the earth.

Other objects and advantages will become apparent as the following detailed description is read in conjunction with the accompanying drawings which illustrate the invention.

DETAILED DESCRIPTION OF A PREFERRED EMBODIMENT OF THE INVENTION

Figure 1:
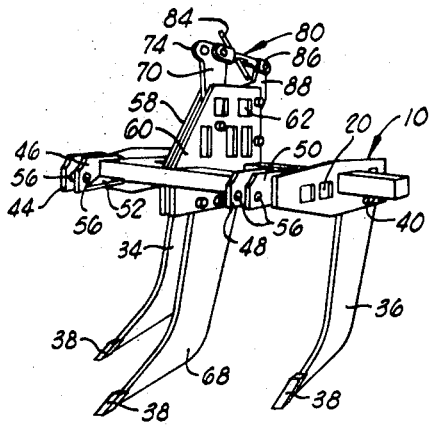
FIG. 1 is a perspective view of the chisel plow of the invention.
Figure 2:
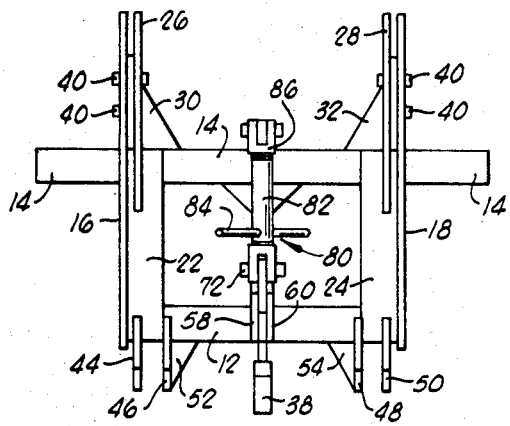
FIG. 2 is a top plan view of the chisel plow illustrated in FIG. 1.

Referring to the drawings, shown therein is a chisel plow constructed in accordance with the present invention. The chisel plow includes a framework 10 which, in the illustrated embodiment of the invention, is a generally rectangular structure which includes a forward transverse frame member 12 and a rear transverse frame member 14 which extends substantially parallel to the forward transverse frame member and is spaced horizontally therefrom. The forward and rear transverse frame members 12 and 14 are preferably hollow beams of rectangular cross section.

Figure 3:
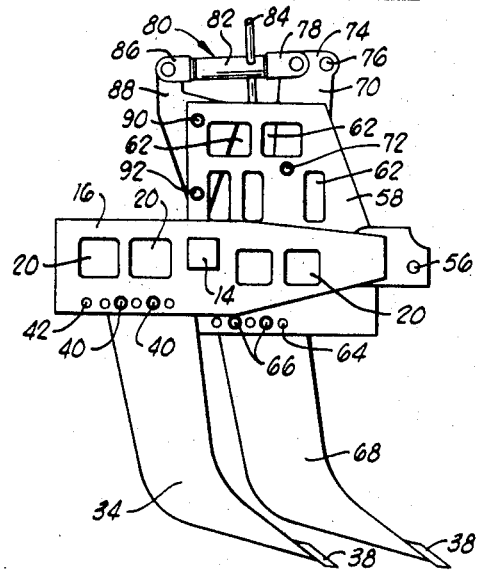
FIG. 3 is a side elevation view of the chisel plow illustrated in FIG. 1.
Figure 4:
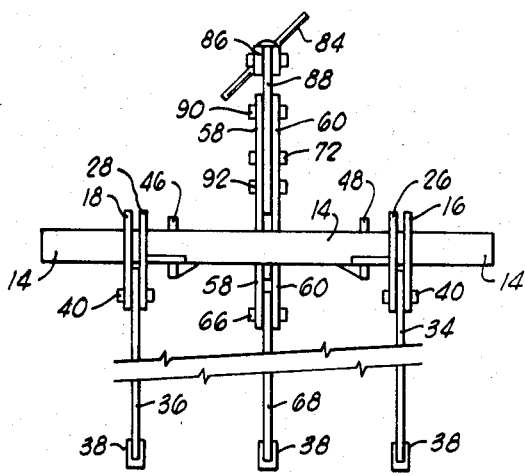
FIG. 4 is a rear elevation view of the chisel plow illustrated in FIG. 1.
Figure 5:
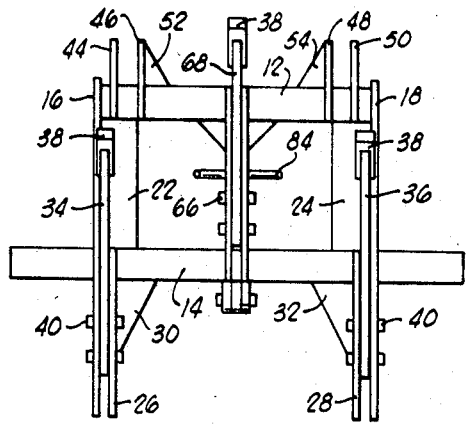
FIG. 5 is a bottom plan view of the chisel plow illustrated in FIG. 1.
Figure 6:
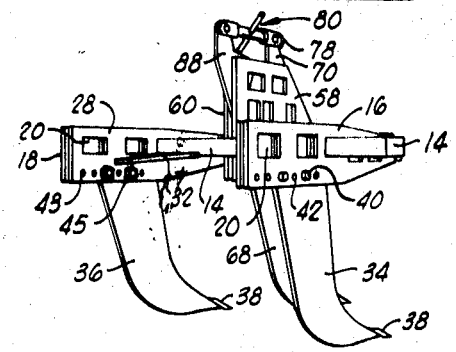
FIG. 6 is a rear perspective view of the chisel plow illustrated in FIG. 1.

The frame 10 is further characterized in having a pair of substantially parallel, fore-and-aft extending, horizontally spaced side frame members 16 and 18, these being metal plates in the illustrated embodiment of the invention. It will be noted in referring to FIG. 3 that the side frame member 16 there illustrated has a plurality of large openings 20 formed therein over its length and functioning to reduce the weight of the frame 10. The side frame member 18 is of identical configuration and construction to the side frame member 16. It will also be noted in referring to FIG. 3 that the rear transverse frame member 14 extends through the side frame members 16 and 18, and is secured thereto by welding or other suitable means. The forward transverse frame member 12 is secured between the forward ends of the side frame members 16 and 18 as best illustrated in the bottom plan view appearing in FIG. 5.

Secured across the upper sides of the forward transverse frame member 12 and the rear transverse frame member 14 are a pair of horizontally spaced, fore-and-aft extending brace plates 22 and 24. Extending parallel to the side frame members 16 and 18 and along the rear portion of these plates are a pair or chisel blade securing plates 26 and 28. The chisel blade securing plates 26 and 28 have a forward portion which extends over, and is welded to, a rear portion of the respective brace plates 22 and 24, and a rear portion which extends rearwardly from the frame 10 and is secured to the back edge of the transverse frame member 14 and is further supported in this position by a pair of gusset plates 30 and 32. The chisel blade supporting plates 26 and 28 are located relatively close to the side frame members 16 and 18, with the space between the chisel blade supporting plates and the side frame plates being sufficient to accommodate the upper end or shank portions of a pair of chisel blades 34 and 36. It will be noted in referring to FIGS. 1 and 3 of the drawings that the chisel blades 34 and 36 each have a downwardly and forwardly curved configuration, and each carries at its forward end a wear plate or show 38.

The shank portion of the chisel blades 34 and 36 is retained between the respective chisel blade supporting plates 26 and 28 and side frame members 16 and 18 by a pair of shear bolts 40 which are extended through selected ones of a group of horizontally spaced apertures 42 formed in the side frame members 16 and 18. The apertures 42 in the side frame members 16 and 18 are aligned with registering apertures 43 in the chisel blade supporting plates 26 and 28 so that the bolts 40 can be extended through the latter apertures and secured in position by means of suitable nuts 45 threaded thereon.

Secured to the outer ends of the forward transverse frame member 12 are two pairs of parallel hitch brackets, the brackets in one pair thereof being designated by reference numerals 44 and 46, and the brackets in the other pair thereof being designated by reference numerals 48 and 50. The gusset plates 52 and 54 are used to reinforce the hitch brackets 46 and 48. The hitch brackets 44—50 in each pair of these brackets have aligned apertures 56 therein to facilitate the extension of a connecting pin therethrough when the pairs of hitch brackets are used to secure the chisel plow to the outer links of a three-point hitch connection of the type provided on agricultural tractors.

Extending between a central portion of the forward transverse frame member 12 and the central portion of the rear transverse frame member 14 are a pair of parallel, vertically extending plates 58 and 60. The plates 58 and 60 are spaced horizontally from each other to accommodate certain structure hereinafter described, and are each provided with a plurality of apertures or openings 62 therein to reduce the weight of the chisel plow structure. It will also be noted that the parallel, vertically extending plates 58 and 60 extend upwardly above the plane of the framework 10, as well as below the plane of the framework. In addition to the weight reducing openings or apertures 62, the plates 58 and 60 also carry a plurality of aligned or registering small bolt holes 64 which receive shear pins 66 used to secure the shank portion at the upper end of a chisel blade 68 between the lower portions of the plates 58 and 60. The chisel blade 68 is shaped substantially identically to the chisel blades 34 and 36, but is positioned ahead of the latter blades so that the three blades, when considered conjunctively, are in a V-shaped array with the chisel blade 68 constituting the leading blade. As in the case of the chisel blades 34 an 36, the tip of the chisel blade 68 carries a wear plate or show 38.

Extending downwardly between the forward, upper end portions of the plates 58 and 60 is a central hitch plate 70. The lower end portion of the central hitch plate 70 is secured between the plates 58 and 60 by a pivot bolt 72. The upper portion of the central hitch plate 70 projects above the upper edges of the plates 58 and 60 and has a forwardly projecting nose portion 74 which is provided with an aperture or opening 76 used to connect thereto the central link of a three-point hitch connection as hereinafter described. Secured to the central hitch plate 70 to the rear of the aperture 76 is the forward bracket 78 of a turnbuckle assembly designated generally by reference numeral 80. The turnbuckle assembly 80 further includes a central sleeve 82 which is provided with a handle 84 which permits it to be rotated during the use of the turnbuckle assembly. At its rear side, the turnbuckle assembly 80 includes a rear bracket 86 which is connected to the upper end portion of an adjustment plate 88. The adjustment plate 88 is secured between the plates 58 and 60 by a pair of bolts 90 and 92 which are extended through the plates 58 and 60 and through the adjustment plate.

In the operation and use of the chisel plow of the invention, the outer links of a three-point hitch connection carried by an agricultural tractor are initially secured between the pairs of outer hitch brackets 44 and 46, and 48 and 50. The central link of the three-point hitch connection is then connected by a suitable bolt or pin to the central hitch plate 70 by extending a bolt or pin through the aperture 76 in the nose portion 74 of this hitch plate. It will be noted that by the use of the turnbuckle assembly 80, and due to the pivotal attachment of the central hitch plate 70 between the plates 58 and 60, some adjustment may be made in the position of the central hitch plate 70 so as to more easily accommodate it to connection with the central link of the three-point hitch connection.

With the plow connected to the tractor in the manner described, the angle of attack of the chisel blades 34, 36 and 68 with respect to the horizontal or to the surface of the ground may be varied by manipulation of the turnbuckle assembly 80. This is a particularly useful feature of the invention in that it permits the plow, which is very large for this type of agricultural implement, to be more easily "sucked" by the tractor into the ground and removed from the ground at the completion of the plowing. It also permits better control of the depth to which the chisel blades will penetrate the soil.

Although a particular embodiment of the invention has been herein described in order to clearly illustrate the principles which the invention embodies, it is to be understood that various changes and alternations in the structure depicted and described can be effected without departure from these principles. All innovations and changes of this type are therefore deemed to be circumscribed by the spirit and scope of the invention.

I claim:

1. A subsoiler chisel plow comprising:

A horizontally extending frame having a forward side and a rear side;

a plurality of downwardly and forwardly extending chisel blades secured to said frame;

a pair of parallel, vertically extending plates secured to said frame and projecting upwardly therefrom;

an additional chisel blade having an upper end portion secured between said parallel, vertically extending plates and extending downwardly and forwardly therefrom;

a central hitch plate pivotally secured between the forward, upper end portions of said parallel, vertically extending plates and projecting above said parallel plates, said hitch plate being adapted for connection of a hitch link thereto;

an adjustment plate secured rigidly between the rear, upper end portions of said parallel vertically extending plates; and adjustable length means connected between said central hitch plate and said adustment plate for pivoting said hitch plate toward and away from said adjustment plate.

2. A subsoiler chisel plow as defined in claim 1 and further characterized in having:

a first pair of hitch brackets on the forward side of said frame and horizontally spaced from said parallel, vertically extending plates;

a second pair of hitch brackets on the forward side of said frame and located on the opposite side of said parallel, vertically extending plates from said first pair of hitch brackets.

3. A subsoiler chisel plow as defined in claim 1 wherein said frame comprises:

a forward transverse frame member;

a rear transverse frame member spaced horizontally from and extending parallel to said forward transverse frame member; and a pair of horizontally spaced, substantially parallel side frame members interconnecting said forward and rear transverse frame members.

4. A subsoiler chisel plow as defined in claim 1 wherein said adjustable length means comprises a turnbuckle assembly.

5. A subsoiler chisel plow as defined in claim 1 and further characterized to include chisel blade securing plates secured to said frame; and shear pins securing the upper end of each of said chisel blades to one of said chisel blade securing plates.